United States Patent [19]

Honeycutt et al.

[11] Patent Number: 4,677,398

[45] Date of Patent: Jun. 30, 1987

[54] PULSED DIGITAL MULTIPLEX LASER GENERATOR

[75] Inventors: Thomas E. Honeycutt, Somerville; Thomas G. Roberts, Huntsville, both of Ala.

[73] Assignee: The United States of America as represented by the Secretary of the Army, Washington, D.C.

[21] Appl. No.: 758,919

[22] Filed: Jul. 25, 1985

[51] Int. Cl.$^4$ .......................... H01S 3/00; H04B 9/00
[52] U.S. Cl. ....................................... 332/7.51; 370/2; 370/3
[58] Field of Search ...................... 370/2, 3; 332/7.51; 330/4.3

[56] References Cited

U.S. PATENT DOCUMENTS

| | | | |
|---|---|---|---|
| 3,501,640 | 3/1970 | Harris | 370/2 |
| 3,617,710 | 11/1971 | Honeycutt | 330/4.3 |
| 3,633,034 | 1/1972 | Uchida et al. | 370/3 |
| 3,633,055 | 1/1972 | Vohida et al. | 370/2 |
| 3,671,747 | 6/1972 | Duguay | 370/2 |
| 4,341,438 | 1/1982 | Seki et al. | 370/3 |
| 4,566,761 | 1/1986 | Carlsen et al. | 370/2 |
| 4,592,043 | 5/1986 | Williams | 370/3 |
| 4,606,020 | 8/1986 | Ruffin | 370/3 |

OTHER PUBLICATIONS

IEEE Journal of Quantum Electronics, col. QE-8, No. 2, Feb. 1972, pp. 91-92, "FM-CW Radar Range Measurement with a $CO_2$ Laser", T. E. Honeycutt et al.

Primary Examiner—Salvatore Cangialosi
Attorney, Agent, or Firm—Sheldon Kanars; Jeremiah G. Murray; John T. Rehberg

[57] ABSTRACT

A system of lasers which produces a single pulsed laser beam carrying many channels of digital information simultaneously. The information content of each laser output pulse is determined by the presence or absence of one or more input signal channel frequencies. The presence or absence of each frequency is provided by a plurality of low power CW lasers operating at different frequencies and which are selectively gated in a binary fashion by pulse coded digital input signals to provide digitized low power laser outputs in accordance with the digital input signals. The low level pulses of the various optical frequencies are combined and utilized to preload a relatively high power pulsed $CO_2$ output laser. A pair of mirror assemblies are utilized to respectively combine the multifrequency channel pulses and transmit a single pulsed output laser beam generated by the pulsed output laser. The presence or absence of each frequency component in each output pulse is determined by the frequency components preloading the cavity modes of the pulsed high power output laser.

14 Claims, 3 Drawing Figures

PULSED DIGITAL MULTIPLEX LASER GENERATOR

The invention described herein may be manufactured, used and licensed by or for the Government for governmental purposes without the payment of any royalties thereon or therefor.

BACKGROUND OF THE INVENTION

1. Field of the Invention

This invention relates generally to laser communications systems and more particularly to a pulsed digital laser generator therefor.

2. Description of the Prior Art

The processing steps of a digital communications system are from the information source through the transmitter, receiver modems and ultimately to the information sink. The key feature of a digital communications system is that it only sends a set of finite messages in contrast to an analog communications system which can send an infinite set of messages. The objective at the receiver end of the digital system is not to reproduce a waveform with precision, but on the other hand, it is the objective to determine from a noise perturbed signal which of the finite waveforms had been sent by the transmitter. These properties make it particularly useful for satellites, networks, telephony and other appliations where computers need to communicate with other computers.

Laser communications systems are generally broken down into a generator to produce the carrier wave, a modulator to impress information on the carrier according to an input signal, a transmission medium, a receiver and demodulator. In digital systems, use is made of pulse code modulation (PCM) in which one bit of digital information in the input signal is represented by the carrier being in one of two binary states at a particular time. The efficiency of such a system depends on how much information the laser beam can be made to carry in the specific time period, how much of the energy of the carrier is wasted in effecting the modulation, and how well the difference between the two carrier states is observed in transmission.

In fulfillment of these objectives, an impressive assortment of signal processing techniques has been proposed. One such technique comprises the apparatus disclosed in U.S. Pat. No. 3,617,710, entitled, "Multiplexed Digital Laser Generator", which issued to Thomas E. Honeycutt, one of the present inventors, on Nov. 2, 1971. Disclosed there is a laser transmission system including a generator which transmits several channels of digital information simultaneously. This system, however, utilizes a continuous wave (CW) laser which is wasteful of energy and severely limits the number of bits that may be concurrently transmitted. The number of bits which may be transmitted at any point in time is governed by the bandwidth of the laser gain curve above the threshold for inhomogeneously broadened laser lines. In CW lasers of reasonable length, only one longitudinal mode can be made to lase at a time; however, several frequencies can still lase at once by exciting one or more transverse modes. This tends to promote mode competition and makes it difficult to control the frequencies which are being emitted. The teachings of this patent, furthermore, are intended to be specifically incorporated herein by reference.

Accordingly, it is an object of the present invention to provide an improvement in laser communications systems.

It is another object to provide an improvement in digital laser communications systems.

It is still another object of the present invention to provide a pulsed digital multiplexed laser communications system.

It is a further object of the present invention to provide a pulsed digital multiplexed laser communications system which overcomes the limitations imposed by mode competition.

It is yet a further object of the invention to provide a pulsed digital multiplexed laser communications system which operates at an increased laser gain with an additional increase in efficiency.

SUMMARY OF THE INVENTION

Briefly, the foregoing and other objects of the invention are achieved by a plurality of relatively low power frequency controlled CW laser oscillators, the outputs of which are modulated by respective optical valves or switches, which are turned on and off in response to respective pulse coded binary digital input signals. The pulse code modulated optical signals are combined by a set of reflective elements to pre-load the cavity modes of a relatively high powered pulsed output laser which is coupled to an output optic assembly. The output of the pulsed laser comprises an optical pulse train containing the frequencies of the pulse code modulated outputs of the low power input lasers. The pulsewidth of the output laser is made extremely narrow so that the pulse is terminated before mode competition can cause other frequencies to be emitted or cause the desired frequencies to cease to be emitted. A short pulsewidth is utilized permitting a high repetition rate, thus increasing the speed of the communications system. The efficient generation of a single output laser beam carrying many channels of digital information simultaneously is thus provided. Information can be transmitted at N times the serial transmission rate, where N is the number of frequencies that are made to lase simultaneously, with the number of frequencies increasing as a function of increased operating pressure of the pulsed output laser.

BRIEF DESCRIPTON OF THE DRAWINGS

DESCRIPTION OF THE PREFERRED EMBODIMENT

Figure 1:
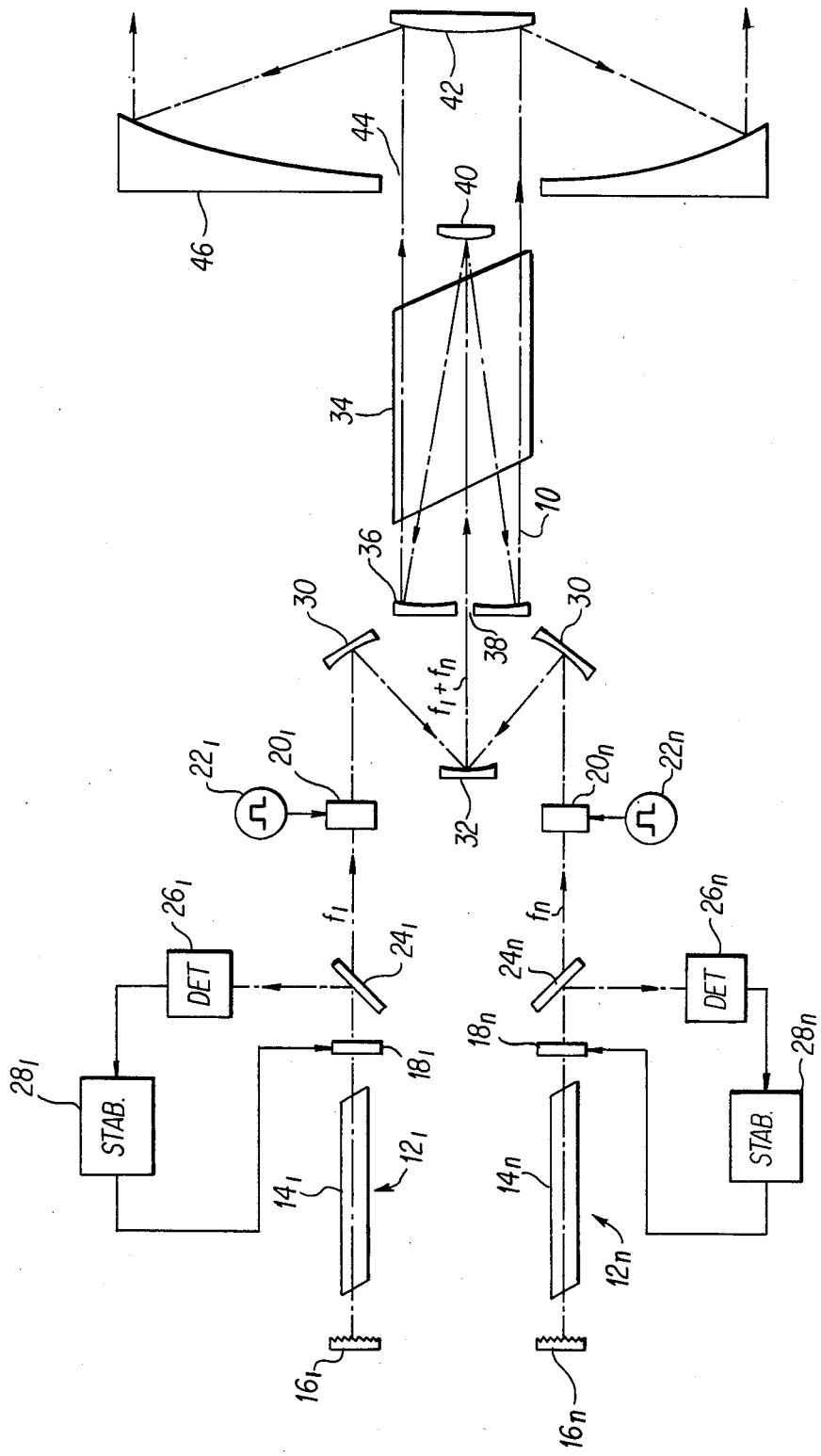
FIG. 1 is a partial side elevational view schematically illustrative of the preferred embodiment of the invention.

Referring now to the drawings and more particularly to FIG. 1, reference numeral 10 designates a relatively high power pulsed output laser, preferably comprising a $CO_2$ gas laser, the modes of which are preloaded by the respective pulse coded outputs from a plurality of frequency stable low power continuous wave (CW) input lasers $12_1 \ldots 12_n$ operating at mutually different frequencies $f_1 \ldots f_n$. Further, each of the input lasers $12_1 \ldots 12_n$ is respectively comprised of a $CO_2$ gas laser cavity including a laser amplifier device $14_1 \ldots 14_n$ located between a reflective grating $16_1 \ldots 16_n$, which operates as a dispersing means, and a partially reflecting output mirror $18_l \ldots 18_n$ which is operable to direct a low power CW laser beam to a high speed light valve or switch $20_l \ldots 20_n$. Each switch is respectively opened or closed, i.e. turned on or off in response to pulse coded binary digital input signals from the input signal sources $22_l \ldots 22_n$.

The respective laser outputs of the low power CW lasers $12_l \ldots 12_n$ are furthermore stabilized by a stabilization system based on an article by A. D. White in the *IEEE Journal of Quantum Electronics*. entitled, "Stabilization of Gas Lasers", November, 1965. Each such system includes a beam splitter $24_l \ldots 24_n$, an extremely fast response optically sensitive detector $26_l \ldots 26_n$ and stabilization circuitry $28_l \ldots 28_n$ and stabilization circuitry $28_l \ldots 28_n$ which operates to maintain the mechanical alignment of the respective output mirror $18_l \ldots 18_n$ so as to keep the frequency $f_l \ldots f_n$ of the generated laser beam at the desired value.

Accordingly, each signal input source $22_l \ldots 22_n$ digitally drives an optical switch $20_l \ldots 20_n$ so as to pass or interrupt the respective CW laser beam. The digitally modulated, i.e. transmitted or inhibited, laser beams of discrete frequencies $f_l \ldots f_n$ are directed to a first set of small reflective mirrors 30 whereupon they are directed to a combining mirror 32. A composite beam of digitally modulated light beams or frequencies $f_l \ldots f_n$ is formed and optically coupled to the cavity of the high power pulsed output laser 10. The laser 10 is shown comprising laser amplifier apparatus 34 located between a cavity whose length is defined by a paraboloidal mirror 36 containing a centralized input aperture 38 and a hyperboloidal mirror 40. The two mirrors 36 and 40 comprise what is known as a Cassegrainian mirror assembly.

In operation, the digitally modulated composite beam reflected from the mirror 32 preloads or pumps different frequency modes of the high power laser 10 with photons. The laser 10 is now pulsed and an output beam is produced containing only those frequencies corresponding to the modes which were preloaded, i.e. the frequencies of the optical energy digitally gated out of the optical switches $20_l \ldots 20_n$ in accordance with the digital input signals applied from the respective input signal sources $22_l \ldots 22_n$. The pulsed output beam from the laser 10 including the presence or absence of each frequency $f_l \ldots f_n$ is directed to a second or output Cassegrainian mirror assembly comprised of a hyperboloidal mirror 42 which receives the output beam reflected from the cavity mirror 36 through the central aperture 44 of a relatively large paraboloidal output mirror 46. The output mirror 46 projects an output beam to a remotely located receiver, not shown.

Figure 2:
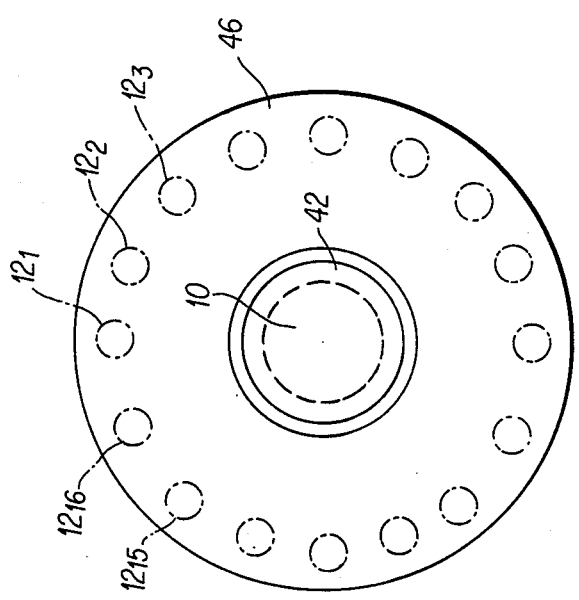
FIG. 2 is a partial front elevational view further illustrative of the embodiment shown in FIG. 1.

The embodiment shown in FIG. 1 is furthermore intended to comprise a coaxial configuration such as shown in FIG. 2 wherein sixteen separate CW lasers $12_1$ through $12_{16}$ operate to preload and pulse the output laser 10. Further shown in FIG. 2, are the hyperboloidal mirror 42 and the paraboloidal mirror 46 of the output mirror assembly.

When the output laser 10 is pulsed, those frequencies which correspond to the modes which have been loaded via mirrors 30, 32, cause the laser cavity to lase. As the optical pulse of the pulsed output laser 10 continues in time, some of the mode frequencies tend to terminate due to mode competition. Therefore, the excitation pulse to the optical medium 34 of the output laser 10 is made short relative to this time. The actual pulse length will depend upon which modes are used and on the chosen operating conditions. The presence of the frequency f indicates, for example, a binary "1" state, while the absence of a frequency indicates a binary "0" state. The excitation of the output laser 10 is stopped and the pulse is terminated before the preloaded frequencies stop lasing or before other frequencies can start to lase. Accordingly, the optical switches $20_l \ldots 20_n$ are reset to transmit the next digital word for the respective signal channel as soon as possible so that the output laser 10 can be repulsed to repeat the process.

The number of frequencies N that can be made to lase simultaneously depends on the width of the gain curve and on the frequency separation between modes. The frequency separation between longitudinal modes is given by the expression c/2L where c is the velocity of light in the medium and L is the length of the optical cavity. For a cavity length of approximately L=1.5 meters, a longitudinal mode separation would be in the order of 100 MHz.

The bandwidth of the gain curve furthermore increases with pressure in the gain medium. For example, in a $CO_2$ laser, the width of the gain curve is 5 MH/torr. Accordingly, for $CO_2$ high pressure pulsed lasers, the width of the gain curve may vary from approximately 3500 MHz to as high as 15,000 MHz. It should also be pointed out that the higher pressures are inherently well suited for operation at short pulse lengths. While a $CO_2$ laser has been disclosed, it should be noted that other types of pulse lasers may be used. Additionally, the low power CW lasers can, when desired, be comprised of liquid or solid state lasers.

Figure 3:
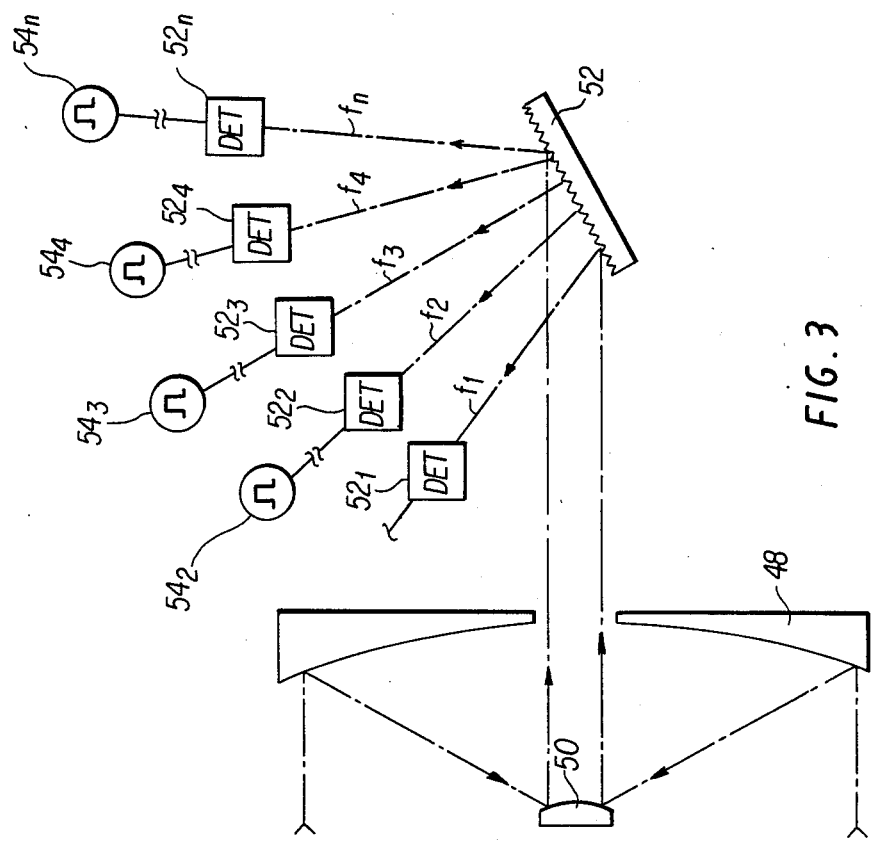
FIG. 3 is a schematic diagram illustrative of an optical receiver for use with the embodiment shown in FIG. 1.

A receiver for a laser communications system including the embodiment shown in FIG. 1 is disclosed in FIG. 3 where, for example, a Cassegrainian type of receiving optics including a converging paraboloidal mirror element 50 which reflects the received optical energy to a dispersing element 52 shown comprising a grating where the incoming laser beam is separated spatially according to frequency components $f_l, f_2, f_3 \ldots f_n$. Sensitive rapid response detectors $52_1, 52_2 \ldots 52_n$ are arranged to intercept the frequency components $f_1, f_2$, etc. to provide electrical digital information signals to appropriate electrical utilization circuits $54_l \ldots 54_n$ including amplifiers, not shown. When desirable, the dispersing element 52 may comprise a single Brewster-angle prism or a combination of many such prisms or other devices which are operable to attain the required optical frequency dispersion.

While not shown, separate local oscillators can be utilized with each of the detectors $52_l \ldots 52_n$ to enhance the sensitivity of reception by optical heterodyne detection.

Thus what has been shown and described is a laser communications system where N frequency components can be included within each output pulse of a pulsed laser with components being determined by the digital control of optical switches which are placed in the path of a plurality of N oscillators in the form of CW lasers operating at respectively different frequencies.

Having thus shown and described what is at present considered to be the preferred embodiment of the invention, it should be noted that the same has been made by way of illustration and not limitation. Accordingly, all modifications, alterations and changes coming within the spirit and scope of the invention as defined in the appended claims are herein meant to be included.

We claim:

1. A pulsed digital multiplex laser generator, comprising:
   a plurality of optical signal sources operating at respectively different frequencies;
   a like plurality of pulse coded digital input signal sources;
   respective modulators coupled to said plurality of optical signal sources and being responsive to pulse coded input signals from said pulse coded input signal sources to pulse code modulate the output of said optical signal sources to provide a set of digitally modulated optical frequency components;
   means for combining said set of optical frequency components into a composite optical signal; and
   an output laser system operable in a pulsed mode of operation and being responsive to said composite optical signal and being preloaded by said frequency components to generate a single pulsed output beam containing said frequency components.

2. The laser generator as defined by claim 1 wherein said plurality of optical signal sources comprise a respective plurality of CW lasers.

3. The laser generator as defined by claim 2 wherein said output laser system comprises a gas laser.

4. The laser generator as defined by claim 3 wherein said means for combining said set of frequency components into a composite optical signal comprises a set of reflective mirrors for converging said set of pulse code modulated optical frequency components to a common point and thereafter reflecting said set of optical frequency components as a composite optical signal to said output laser system.

5. The laser generator as defined by claim 3 wherein said output laser system includes plural mirrors defining an optical cavity and laser amplifying means disposed within said cavity, and wherein one of said plural mirrors include an aperture for coupling said composite optical signal into said cavity.

6. The laser generator as defined by claim 5 wherein said plural mirrors include a paraboloidal mirror at one end of said cavity in registration with said laser amplifying means and a hyperboloidal mirror at the other end of said cavity also in registration with said laser amplifying means.

7. The laser generator as defined by claim 6 and additionally including output mirror means located adjacent said output laser system for directing said output beam to a remote location.

8. The laser generator as defined by claim 7 wherein said output mirror means comprises a Cassegrainian mirror system.

9. The laser generator as defined by claim 8 wherein said Cassegrainian mirror system includes a hyperboloidal mirror directed to said paraboloidal mirror of said optical cavity and a paraboloidal mirror located therebetween and having an aperture whereby said output beam from said optical cavity is directed to said hyperboloidal mirror which is thereafter reflected therefrom to an outwardly directed reflecting surface included in said paraboloidal mirror.

10. The laser generator as defined by claim 3 wherein said modulators comprise light switch means which are operable to either pass or inhibit the passage of optical energy therethrough in response to said pulse coded input signals.

11. The laser generator as defined by claim 3 wherein said output laser system comprises a $CO_2$ gas laser.

12. The laser generator as defined by claim 1 wherein said plurality of optical signal sources comprise a plurality of CW gas lasers.

13. The laser generator as defined by claim 12 wherein said plurality of gas lasers are comprised of $CO_2$ gas lasers.

14. The laser generator as defined by claim 12 and additionally including respective stabilization system means coupled to said plurality of CW gas lasers for operating the respective lasers at or near the center of their gain curve.

* * * * *